(12) United States Patent
Yang (10) Patent No.: US 11,054,519 B2
(45) Date of Patent: Jul. 6, 2021

(54) VEHICLE DRIVING CONTROLLER AND METHOD THEREFOR

(71) Applicants: HYUNDAI MOTOR COMPANY, Seoul (KR); KIA MOTORS CORPORATION, Seoul (KR)

(72) Inventor: Jeong Seog Yang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 146 days.

(21) Appl. No.: 16/667,308

(22) Filed: Oct. 29, 2019

(65) Prior Publication Data
US 2021/0018614 A1   Jan. 21, 2021

(30) Foreign Application Priority Data
Jul. 15, 2019   (KR) ................. 10-2019-0085225

(51) Int. Cl.
| | | |
|---|---|---|
| *G01S 13/93* | (2020.01) | |
| *B60W 30/16* | (2020.01) | |
| *G01S 13/86* | (2006.01) | |
| *G05D 1/02* | (2020.01) | |
| *G01S 13/931* | (2020.01) | |

(52) U.S. Cl.
CPC ........... *G01S 13/931* (2013.01); *B60W 30/16* (2013.01); *G01S 13/867* (2013.01); *G05D 1/0257* (2013.01); *B60W 2420/52* (2013.01); *B60W 2554/801* (2020.02); *G01S 2013/9321* (2013.01); *G01S 2013/9325* (2013.01)

(58) Field of Classification Search
CPC ........... G01S 13/931; G01S 2013/9325; G01S 2013/9321; G05D 1/0257; B60W 30/16; B60W 2554/801; B60W 2420/52
See application file for complete search history.

(56) References Cited

U.S. PATENT DOCUMENTS

| | | | | |
|---|---|---|---|---|
| 5,635,922 A | * | 6/1997 | Cho ........................ | G01S 17/931 340/903 |
| 2005/0273218 A1 | * | 12/2005 | Breed ....................... | B60R 21/20 701/2 |
| 2007/0152804 A1 | * | 7/2007 | Breed ..................... | B60W 30/16 340/435 |
| 2008/0106436 A1 | * | 5/2008 | Breed ..................... | G08G 1/166 340/905 |
| 2015/0197248 A1 | * | 7/2015 | Breed ..................... | G08G 1/167 701/93 |
| 2018/0319402 A1 | * | 11/2018 | Mills ..................... | B60W 30/10 |

* cited by examiner

*Primary Examiner* — Mussa A Shaawat
(74) *Attorney, Agent, or Firm* — Lempia Summerfield Katz LLC (57) ABSTRACT

A vehicle driving controller includes a determination device that identifies a change in location of a reference interval. The reference interval has a certain magnitude value in power spectrum data received from a radar sensor, which detects a preceding vehicle in front of a host vehicle and determines whether there occurs an altitude difference between the host vehicle and the preceding vehicle based on the change in the location of the reference interval. The driving controller includes a correction device that corrects a power spectrum using a virtual layer when it is determined that the altitude difference exists between the host vehicle and the preceding vehicle. The driving controller includes a controller that controls the driving of the host vehicle based on the corrected spectrum.

22 Claims, 9 Drawing Sheets

VEHICLE DRIVING CONTROLLER AND METHOD THEREFOR

CROSS-REFERENCE TO RELATED APPLICATION

This application claims the benefit of priority to Korean Patent Application No. 10-2019-0085225, filed in the Korean Intellectual Property Office on Jul. 15, 2019, the entire contents of which are incorporated herein by reference.

TECHNICAL FIELD

The present disclosure relates to a vehicle driving controller and a method therefor.

BACKGROUND

An advanced smart cruise control (ASCC) is one of the driving convenience systems, which automatically adjust a driving speed of a host vehicle based on an interval between the host vehicle and a preceding vehicle. The driver can relax while driving because such an ASCC maintains a certain interval between the host vehicle and the preceding vehicle and drives the host vehicle although a driver of the host vehicle does not perform separate manipulation. However, when such a driving convenience system performs an incorrect operation or an incorrect determination, the driver cannot cope with it and this can lead to an accident. In general, the ASCC recognizes the preceding vehicle using a radar of the host vehicle. When there occurs an altitude difference between the host vehicle and the preceding vehicle, the ASCC may fail to detect the preceding vehicle using the radar. In this case, although there exists the preceding vehicle in front of the host vehicle, the ASCC may incorrectly determine that there is no preceding vehicle. The ASCC performs driving control based on a speed set by the driver when there is no preceding vehicle. Thus, when it does not recognize the preceding vehicle and performs speed-oriented control, an accident may occur.

SUMMARY

The present disclosure is made to solve the above-mentioned problems occurring in the prior art while the advantages achieved by the prior art remain.

An aspect of the present disclosure provides a vehicle driving controller and a method for controlling a vehicle speed of a host vehicle based on an altitude difference between the host vehicle and a preceding vehicle. The vehicle driving controller and the method therefor aim to prevent a safety accident from occurring when incorrectly recognizing the preceding vehicle.

Another aspect of the present disclosure provides a vehicle driving controller and a method for detecting an altitude difference using a power spectrum of a radar, generating a virtual layer, and correcting the power spectrum to minimize an incorrect determination.

The technical problems to be solved by the present inventive concept are not limited to the aforementioned problems. Any other technical problems not mentioned herein will be clearly understood from the following description by those having ordinary skill in the art to which the present disclosure pertains.

According to an aspect of the present disclosure, a vehicle driving controller may include a determination device that identifies a change in location of a reference interval. The reference interval may have a certain magnitude value in power spectrum data received from a radar sensor. The radar sensor may be configured to detect a preceding vehicle in front of a host vehicle and determine whether an altitude difference exists between the host vehicle and the preceding vehicle based on the change in the location of the reference interval. The vehicle driving controller may further include a correction device that corrects a power spectrum using a virtual layer when it is determined that the altitude difference exists between the host vehicle and the preceding vehicle. The vehicle driving controller may further include a controller that controls driving of the host vehicle based on the corrected power spectrum.

The vehicle driving controller may further include a layer generator that generates a virtual layer corresponding to the power spectrum data.

The virtual layer may be generated in response to the power spectrum data received when the host vehicle is traveling on a flatland.

The determination device may determine whether the reference interval in the received power spectrum data moves in an upward or downward direction based on the virtual layer.

The determination device may determine that there occurs the altitude difference between the host vehicle and the preceding vehicle, when the reference interval moves in the upward or downward direction.

The correction device may correct the power spectrum using the virtual layer.

The correction device may correct the power spectrum by compensating for a reference location of the virtual layer to correspond to the reference interval of the received power spectrum data and inserting a predetermined correction value into an interval except for the reference interval.

The correction value may be set to a value corresponding to a maximum value×α% based on the maximum value of the received power spectrum data.

The reference interval may be an interval corresponding to a maximum value to the maximum value×α% based on the maximum value of the power spectrum data.

The vehicle driving controller may further include a sensor device that includes the radar sensor and a front view camera. The determination device may combine the power spectrum data of the radar sensor and upward/downward motion detection information of a front view camera and may determine whether the altitude difference exists between the host vehicle and the preceding vehicle.

The determination device may verify a situation where the host vehicle is traveling on a sloped road, based on information received from at least one of an electronic stability control system, a navigation device, and/or a vehicle speed sensor of the host vehicle, when it is determined that the altitude difference exists between the host vehicle and the preceding vehicle.

The determination device may determine that there is a distance difference of a reference value or more between the host vehicle and the preceding vehicle, when it is determined that the entire magnitude or a maximum value of the received power spectrum data is reduced.

The controller may control driving of the host vehicle based on a current speed of the host vehicle, when it is determined that the distance difference of the reference value or more exists between the host vehicle and the preceding vehicle.

The controller may perform an acceleration control over the host vehicle when the current speed of the host vehicle is less than a setting speed and may perform a control over the host vehicle to follow the preceding vehicle when the current speed of the host vehicle is greater than or equal to the setting speed.

According to another aspect of the present disclosure, a vehicle driving control method may include identifying a change in location of a reference interval having a certain magnitude value in power spectrum data received from a radar sensor. The radar sensor is configured to detect a preceding vehicle in front of a host vehicle. The vehicle driving control method may also include determining whether an altitude difference exists between the host vehicle and the preceding vehicle based on the change in the location of the reference interval, correcting a power spectrum using a virtual layer, when it is determined that the altitude difference exists between the host vehicle and the preceding vehicle, and controlling driving of the host vehicle based on the corrected power spectrum.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 1:
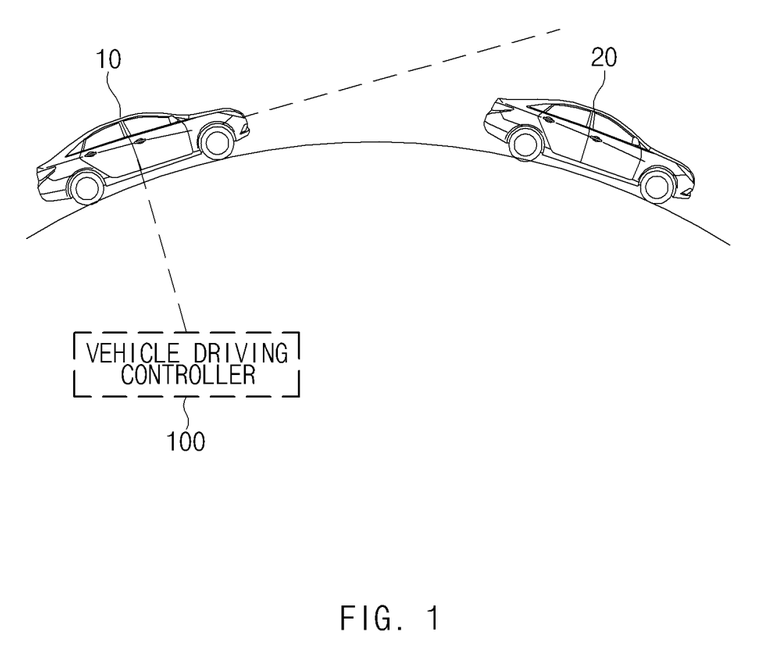
FIG. 1 is a drawing illustrating a configuration of a system to which a vehicle driving controller is applied, according to an embodiment of the present disclosure.

FIG. 1 is a drawing illustrating a configuration of a system, to which a vehicle driving controller is applied, according to an embodiment of the present disclosure.

Referring to FIG. 1, a vehicle driving controller 100 may determine a distance difference, an altitude difference, or the like between a host vehicle 10 and a preceding vehicle based on a change in magnitude of a power spectrum. The vehicle may control the driving of the host vehicle 10 according to the determination. In this case, when it is determined that an altitude difference occurs or exists between the host vehicle 10 and the preceding vehicle 20, the vehicle driving controller 100 may correct the power spectrum using a virtual layer, may determine a distance between the host vehicle 10 and the preceding vehicle 20 based on the corrected power spectrum, and may control driving of the host vehicle 10. Thus, the occurrence of an accident due to an incorrect determination is minimized.

Figure 2:
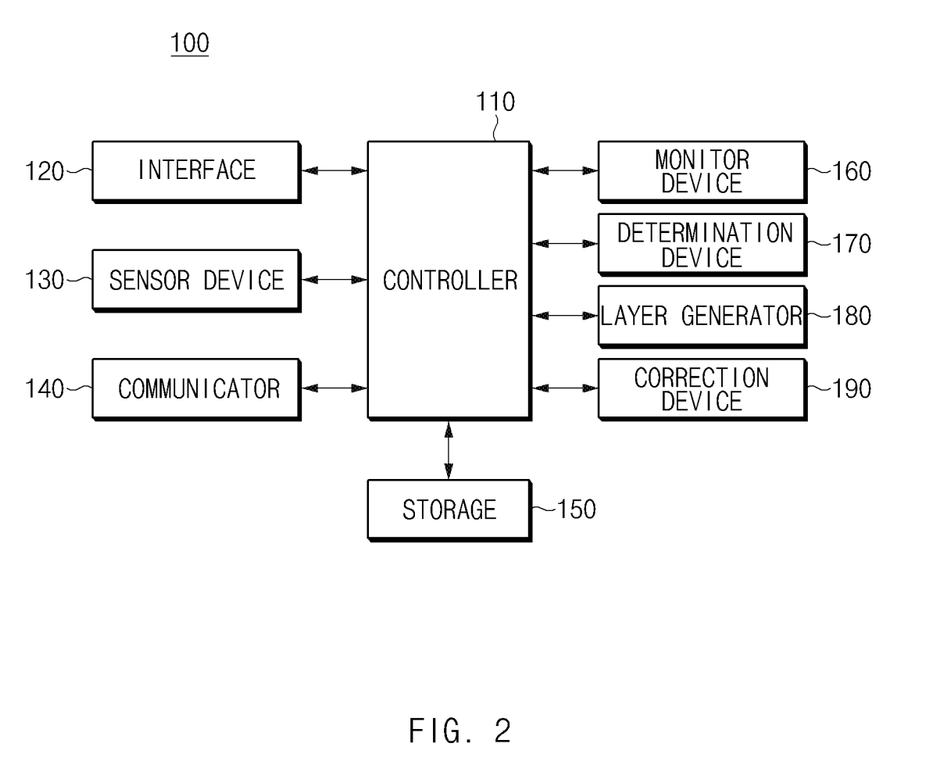
FIG. 2 is a block diagram illustrating a configuration of a vehicle driving controller according to an embodiment of the present disclosure.

Thus, a description is given of a detailed configuration and operation of the vehicle driving controller 100 with reference to an embodiment of FIG. 2.

The vehicle driving controller 100 according to an embodiment of the present disclosure may be implemented in a vehicle. In this case, the vehicle driving controller 100 may be integrated with control units in the vehicle. Alternatively, the vehicle driving controller 100 may be implemented as a device independent of the control units in the vehicle and thus may be connected with the control units of the vehicle by a separate connection means.

FIG. 2 is a block diagram illustrating a configuration of a vehicle driving controller according to an embodiment of the present disclosure.

Referring to FIG. 2, a vehicle driving controller 100 may include a controller 110, an interface 120, a sensor device 130, a communicator 140, a storage 150, a determination device 170, a layer generator 180, and a correction device 190. According to an embodiment, the controller 110, the determination device 170, the layer generator 180, and the correction device 190 of the vehicle driving controller 100 may be implemented as at least one or more processors.

The controller 110 may process a signal transmitted between the respective components of the vehicle driving controller 100.

The interface 120 includes an input means for receiving a control command from a user and an output means for outputting an operation state, an operation result, or the like of the vehicle driving controller 100.

According to an embodiment, the input means may include a key button and may further include a mouse, a joystick, a jog shuttle, a stylus pen, or the like. Also, the input means may include a soft key implemented on a display of a host vehicle 10 of FIG. 1.

The output means may include the display and may further include a voice output means such as a speaker. In this case, if a touch sensor such as a touch film, a touch sheet, or a touch pad is installed in the display, the display may operate as a touch screen and may be implemented in the form of integrating the input means with the output means.

In this case, the display may include at least one of a liquid crystal display (LCD), a thin film transistor-LCD (TFT-LCD), an organic light-emitting diode (OLED) display, a flexible display, a field emission display (FED), and/or a three-dimensional (3D) display.

The sensor device 130 may include at least one or more sensors, which detect an obstacle located around a host vehicle 10 of FIG. 1, for example, a preceding vehicle 20 of FIG. 1 and measure a distance from the preceding vehicle 20. As an example, the sensor device 130 may include a radar sensor.

The sensor device 130 may further include one or more sensors, which measure a state where the host vehicle 10 is traveling. As an example, the sensor device 130 may include a vehicle speed sensor, a camera sensor, or the like.

The communicator 140 may include a communication module for vehicle network communication with electronics and/or control units loaded into the host vehicle 10. The communication module may be communicatively connected with a navigation device loaded into the vehicle and may receive host vehicle location information or road information, for example, altitude information of a road or the like, from the navigation device. Furthermore, the communication module may be communicatively connected with an electronic stability control system provided in the host vehicle 10 to receive attitude information of the host vehicle 10, detected by the electronic stability control system.

According to an embodiment, vehicle network communication technologies may include controller area network (CAN) communication, local interconnect network (LIN) communication, flex-ray communication, or the like.

Further, the communication module may include a module for wireless Internet access or a module for short range communication. According to an embodiment, wireless Internet technologies may include a wireless local area network (WLAN), wireless broadband (Wibro), wireless-fidelity (Wi-Fi), world interoperability for microwave access (WiMAX), or the like. Furthermore, short range communication technologies may include Bluetooth, ZigBee, ultra wideband (UWB), radio frequency identification (RFID), infrared data association (IrDA), or the like.

The storage 150 may store data, an algorithm, and/or the like necessary to operate the vehicle driving controller 100.

The storage 150 may store information detected by the sensor device 130 and may store information received from the navigation device, the electronic stability control system, and/or the like via the communicator 140.

Furthermore, the storage 150 may store a command, an algorithm, and/or the like for: analyzing strength distribution based on a radar power spectrum detected by the sensor device 130; identifying an altitude difference with the preceding vehicle 20; generating a virtual layer of the radar power spectrum; correcting a radar power spectrum according to the altitude difference; and controlling driving of the host vehicle 10 based on the strength distribution of the radar power spectrum.

According to an embodiment, the storage 150 may include storage media such as a random access memory (RAM), a static RAM (SRAM), a read-only memory (ROM), a programmable ROM (PROM), and an electrically erasable PROM (EEPROM).

The monitor device 160 may monitor a change in magnitude of power spectrum data of a radar sensor, received from the sensor device 130 while the vehicle is traveling. In this case, the monitor device 160 may monitor a change in magnitude with respect to a vertical direction of the power spectrum data.

The layer generator 180 may generate a virtual layer corresponding to the power spectrum data received from the sensor device 130. According to an embodiment, the virtual layer may be generated based on the power spectrum data received in a general driving situation, for example, when the host vehicle 10 is traveling on a flatland.

According to an embodiment, the monitor device 160 may compare the power spectrum data received by the radar sensor with a virtual layer previously generated by the radar generator 180 to monitor a change in magnitude of the power spectrum data based on the virtual layer.

The determination device 170 may determine whether there occurs a distance difference between the host vehicle 10 and a preceding vehicle 20 of FIG. 1 based on the monitored result of the monitor device 160.

According to an embodiment, when the host vehicle 10 and the preceding vehicle 20 are away from each other or when the preceding vehicle 20 disappears ahead of the host vehicle 10 due to a change of a lane or road, an entire magnitude and a maximum value of a power spectrum may be reduced.

Thus, when it is determined that a magnitude value for the entire area is reduced in a vertical direction of the power spectrum data or that a maximum value of a power spectrum is reduced, based on the monitoring result of the monitoring device 160, the determination device 170 may determine that a distance difference of a reference value or more occurs or exists between the host vehicle 10 and the preceding vehicle 20.

In this case, the controller 110 may control the driving of the host vehicle 10 based on vehicle speed information. According to an embodiment, when a current speed of the host vehicle 10 is less than a setting speed, the controller 110 may perform acceleration control of the host vehicle 10 such that the host vehicle 10 is traveling at the setting speed. Meanwhile, when it is determined that the current speed of the host vehicle 10 is greater than or equal to the setting speed, the controller 110 may control the host vehicle 10 to follow the preceding vehicle 20.

Furthermore, the determination device 170 may determine whether tan altitude difference occurs or exists between the host vehicle 10 and the preceding vehicle 20 based on the monitoring result of the monitor device 160.

According to an embodiment, when it is determined that a reference interval having a certain magnitude value moves in a vertical direction in the power spectrum data based on the monitoring result of the monitor device 160, the determination device 170 may determine that an altitude difference occurs or exists between the host vehicle 10 and the preceding vehicle 20.

According to an embodiment, the reference interval may be a reference power range for determining an altitude difference between the host vehicle 10 and the preceding vehicle 20. An interval corresponding to a maximum value to the maximum value×α% value may be set to a reference range based on the maximum value of the received power spectrum data.

When the host vehicle 10 is traveling on an uphill road or a downhill road, i.e., a sloped road, an altitude difference may occur between the host vehicle 10 and the preceding vehicle 20. When the altitude difference occurs or exists between the host vehicle 10 and the preceding vehicle 20, the magnitude of the power spectrum may also be changed.

According to an embodiment, when the host vehicle 10 is traveling on an uphill road, because the preceding vehicle 20 is located at a higher side than the host vehicle 10, a reference location may move in an upward direction in the power spectrum data. Meanwhile, the host vehicle 10 is traveling on a downhill road, because the preceding vehicle 20 is located at a lower side than the host vehicle 10, the reference interval may move in a downward direction in the power spectrum data.

Thus, when the reference interval corresponding to the maximum value to the maximum value×α% value in the received power spectrum data moves in the upward or downward direction, the determination device 170 may determine that an altitude difference occurs or exists between the host vehicle 10 and the preceding vehicle 20.

In this case, the determination device 170 may verify whether an altitude difference of a certain value or more occurs or exists between the host vehicle 10 and the preceding vehicle 20 based on data received from a front view camera, an electronic stability control system, a navigation device, or the like.

According to an embodiment, when the front view camera detects an upward/downward motion of a following graphic image on a view vector (and ignores left/right motion), the determination device 170 may verify whether an altitude difference occurs or exists with reference to the condition detected by the front view camera and measurement data of the radar sensor. In this case, the determination device 170 may verify whether the preceding vehicle 20 actually enters an uphill/downhill road at a speed at which the preceding vehicle 20 moves up/down on an image.

Furthermore, the determination device 170 may determine a slope of the host vehicle 10 and a situation where the host vehicle 10 is traveling on an uphill road or a downhill road. The determination device 170 uses information such as map data, an electronic stability control (ESC) sensor, revolutions per minute (RPM) of the host vehicle 10, and a speed of the host vehicle 10 to verify whether an altitude difference occurs or exists between the host vehicle 10 and the preceding vehicle 20.

A power of a partial interval is sharply reduced in the received power spectrum data of the radar sensor in the state where the altitude difference occurs between the host vehicle 10 and the preceding vehicle 20. Thus, when determining a distance between the host vehicle 10 and the preceding vehicle 20 based on the power spectrum, the determination device 170 may determine that a distance difference of a certain value or more occurs between the host vehicle 10 and the preceding vehicle 20.

This is an error determination due to the altitude difference. An accident may occur due to the error determination.

To overcome this problem, when it is determined that the altitude difference occurs between the host vehicle 10 and the preceding vehicle 20, the correction device 190 may correct power spectrum data by using the virtual layer generated by the layer generator 180, rather than the power spectrum data received from the radar sensor.

In this case, the correction device 190 may compensate for the location of the power spectrum of the virtual layer in response to a reference interval of the power spectrum received from the radar sensor. Furthermore, the correction device 190 may correct a location corresponding to an interval having a value which is less than or equal to a maximum value×α% in the power spectrum data received from the radar sensor in the power spectrum, the location of which is compensated, to have the maximum value×α% value or a predetermined correction value.

A detailed description of the operation of correcting the power spectrum will be given with reference to an embodiment of FIG. 5.

The determination device 170 of FIG. 2 may determine whether a distance difference of a reference value or more occurs or exists between the host vehicle 10 and the preceding vehicle 20 based on the corrected power spectrum data.

According to an embodiment, the controller 110 may perform a speed control of the host vehicle 10 based on the setting speed or may perform a following control based on the preceding vehicle 20, according to the determination of the determination device 170.

In this case, when the determination device 170 determines that the distance difference of the reference value or more occurs between the host vehicle 10 and the preceding vehicle 20, the controller 110 may perform the speed control after a certain time elapses while performing a cruise control based on a current speed during a certain time without immediately performing the speed control or while performing the following control based on the preceding vehicle 20.

The vehicle driving controller 100 according to an embodiment of the present disclosure, which performs the above-mentioned operations, may be implemented in the form of an independent hardware device including a memory and a processor for processing each operation. Alternatively, the vehicle driving controller 100 may be driven in the form of being included in another hardware device, such as a microprocessor or a universal computer system.

Figure 3A:
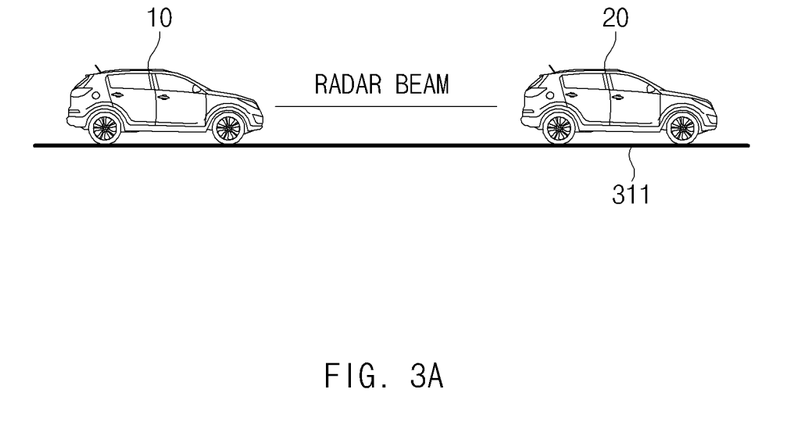
FIGS. 3A, 3B, 4A, 4B, and 5 are drawings illustrating embodiments referenced to describe an operation of a vehicle driving controller according to an embodiment of the present disclosure.
Figure 3B:
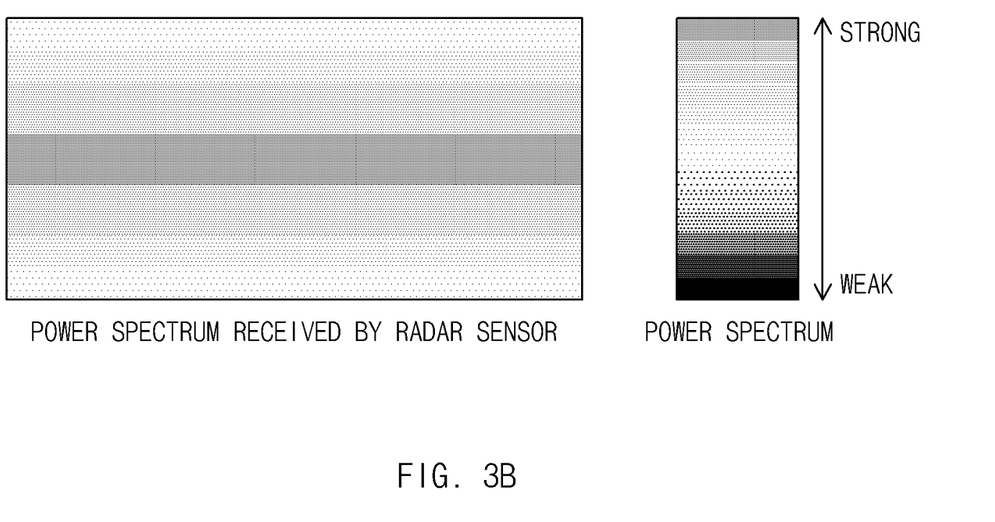

FIGS. 3A and 3B illustrate an embodiment, in which a host vehicle is traveling on a general road, that is, a non-sloped road, i.e., a flatland.

Referring to FIG. 3A, a host vehicle 10 may detect a preceding vehicle 20 on a flatland by using its radar sensor. In this case, a power spectrum received by the radar sensor is shown in FIG. 3B. As shown in FIG. 3B, in a situation where the host vehicle 10 is traveling on the flatland 311, the power spectrum received by the radar sensor may have the largest value in a middle location of the power spectrum. In this case, a radar beam emitted from the host vehicle 10 is reflected from a body of the preceding vehicle 20 and may have a pattern or form, which gradually becomes smaller in magnitude as going to the top and the bottom with respect to the middle location.

Figure 4A:
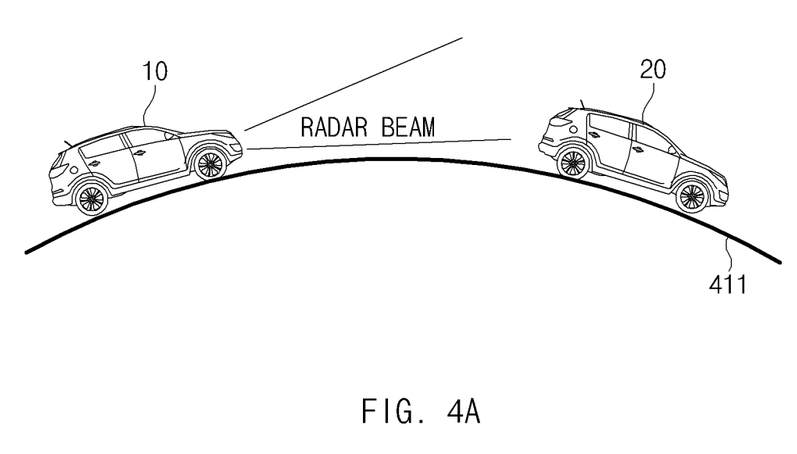
Figure 4B:
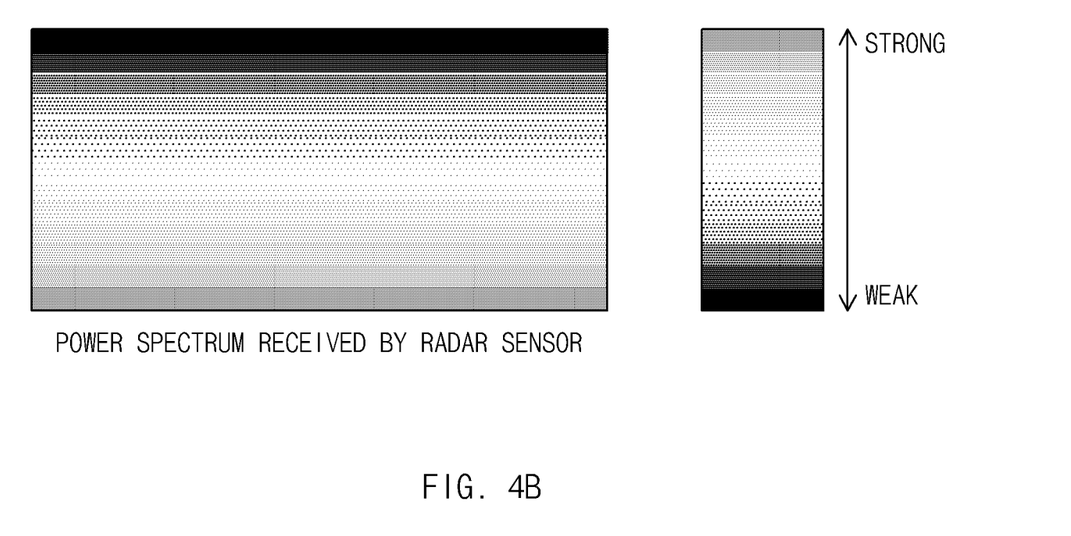

FIGS. 4A and 4B illustrate an embodiment in which a host vehicle is traveling on a road with an altitude difference, that is, an uphill road. FIG. 5 illustrates an embodiment referenced to describe an operation of a vehicle driving controller.

Referring to FIG. 4A, a host vehicle 10 may detect a preceding vehicle 20 on an uphill road 411 by using its radar sensor. A power spectrum received by the radar sensor is shown in FIG. 4B.

As shown in FIG. 4B, in a situation where the host vehicle 10 is traveling on the uphill road 411, the power spectrum received by the radar sensor may have the largest value in a lower location. In this case, a radar beam emitted from the host vehicle 10 is reflected from a body of the preceding vehicle 10 and may have a pattern or form, which gradually becomes smaller in amplitude as going to the top. In this case, because the top of the power spectrum is sharply reduced in magnitude, the host vehicle 10 may incorrectly determine that the preceding vehicle 200 is gradually away from the host vehicle 10.

Figure 5:
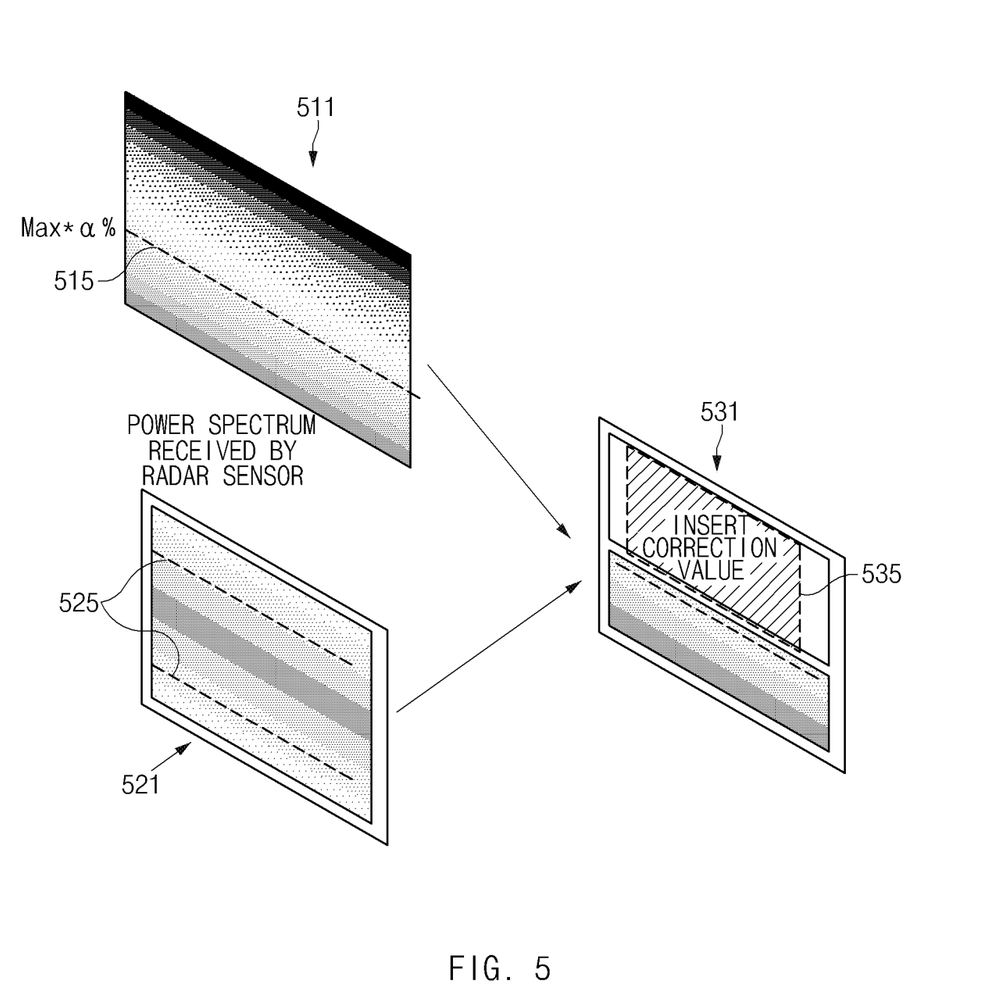

To overcome this problem, as shown in FIG. 5, a vehicle driving controller 100 of FIG. 2 may correct power spectrum data and may determine the preceding vehicle 20 by using the corrected power spectrum data.

Referring to FIG. 5, a reference line 515 for classifying a reference interval (a maximum value to the maximum value×α%) of a power spectrum 511 is received by the radar sensor when the host vehicle 10 is traveling on an uphill road. In this case, the power spectrum 511 is skewed to the bottom and the magnitude of power is sharply reduced at an upper side of the reference line 515.

To overcome this problem, the vehicle driving controller 100 may generate a virtual layer 521 based on the power spectrum (see FIG. 3B) received in a situation where the host vehicle 10 is traveling on a flatland. In this case, the reference interval (the maximum value to the maximum value×α%) is located on a middle portion of the power spectrum in the generated virtual layer 521 and the reference lines 525 for classifying the reference interval (the maximum value to the maximum value×α%) are located in upward and downward directions in the generated virtual layer 521.

The vehicle driving controller 100 may compensate for a location of a reference interval of the generated virtual layer 521 in response to a location of the reference interval (the maximum value to the maximum value×α%) on the power spectrum 511. In this case, in reference numeral 535, the vehicle driving controller 100 may insert a spectrum of magnitude corresponding to a predetermined correction value into an interval where the magnitude of power is sharply reduced like an upper side of the reference line 515 on the power spectrum 511.

As such, the corrected power spectrum 531 is similar to the power spectrum 511 in the location of the reference interval but may have a correction value of a certain level in an interval except for the reference interval. Thus, when determining a distance from the preceding vehicle 20 based on the corrected power spectrum 531 in a situation where the host vehicle 10 is traveling on a road with an altitude difference, such as an uphill road or a downhill road, the vehicle driving controller 100 may minimize an incorrect determination that the host vehicle 10 and the preceding vehicle 20 are away from each other or that the preceding vehicle 20 disappears.

A description is given in detail of an operation flow of the vehicle driving controller 100 according to an embodiment of the present disclosure including the above-mentioned configuration.

Figure 6:
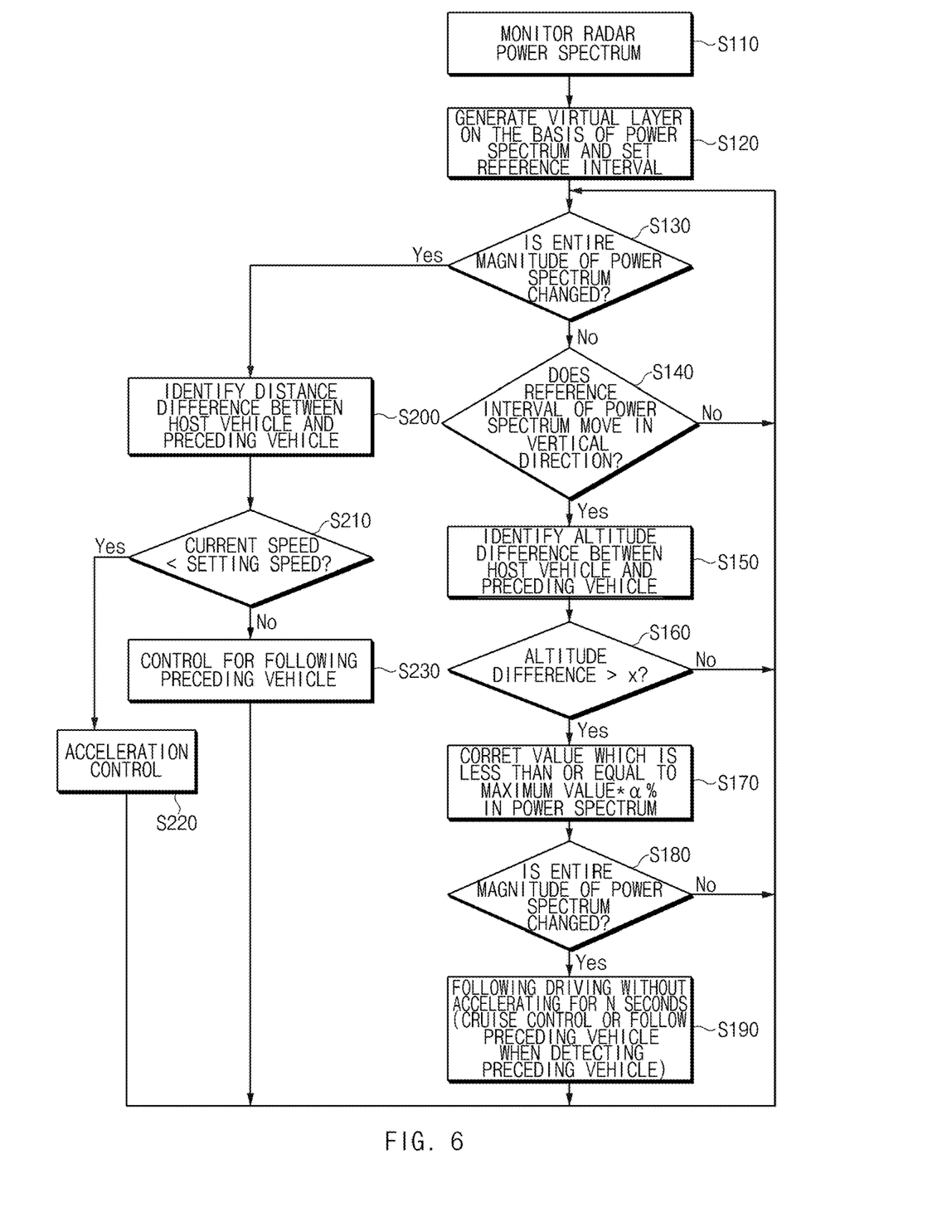
FIG. 6 is a flowchart illustrating an operation of a vehicle driving control method according to an embodiment of the present disclosure.

FIG. 6 is a flowchart illustrating an operation of a vehicle driving control method according to an embodiment of the present disclosure.

Referring to FIG. 6, a vehicle driving controller 100 of FIG. 2 may emit a radar beam toward a preceding vehicle 20 in front of a host vehicle 10 of FIG. 1 by using a radar sensor of the host vehicle 10 when the host vehicle 10 is traveling. In this case, in S110, the vehicle driving controller 100 may monitor radar data reflected and received from the preceding vehicle 20, that is, power spectrum data.

In S120, the vehicle driving controller 100 may generate a virtual layer based on a power spectrum received in a situation where the host vehicle 10 is traveling on a general flatland at the beginning of driving. The vehicle driving controller 100 may set a reference interval (a maximum value to the maximum value×α%) for determining an altitude difference for the power spectrum.

If it is determined that the entire magnitude of the power spectrum is changed based on the monitoring result of the power spectrum data while the host vehicle 10 is traveling in S130, then in S200, the vehicle driving controller 100 may determine that there occurs a distance difference between the host vehicle 10 and the preceding vehicle 20. Although not illustrated in FIG. 6, when a maximum value of the power spectrum is reduced, the vehicle driving controller 100 may determine that a distance difference occurs or exists between the host vehicle 10 and the preceding vehicle 20.

In this case, if a current speed of the host vehicle 10 is less than a setting speed in S210, then in S220, the vehicle driving controller 100 may perform an acceleration control such that the host vehicle 10 travels at the setting speed. If the current speed of the host vehicle 10 is greater than or equal to the setting speed, then in S230, the vehicle driving controller 100 may control the host vehicle 10 to follow the preceding vehicle 20.

Meanwhile, if it is determined that a reference interval having a certain magnitude value in the power spectrum moves in a vertical direction in S140, then in S150, the vehicle driving controller 100 may determine that an altitude difference occurs or exists between the host vehicle 10 and the preceding vehicle 20.

In this case, the vehicle driving controller 100 may verify whether an altitude difference of a certain value or more occurs or exists between the host vehicle 10 and the preceding vehicle 20 based on data received from a front view camera, an electronic stability control system, a navigation device, or the like.

If it is determined that the altitude difference between the host vehicle 10 and the preceding vehicle 20 is greater than a reference value x as a result of the verification in S160, then in S170, the vehicle driving controller 100 may correct the other interval except for the reference interval (a maximum value to the maximum value×α%) of the power spectrum, that is, an interval having a value which is less than or equal to 'the maximum value×α%'. Refer to the embodiment of FIG. 5 for a detailed description of the operation of correcting the power spectrum.

If it is determined that the entire magnitude of the power spectrum is reduced or the maximum value is as reduced in S180, based on the power spectrum corrected in S170, then in S190, the vehicle driving controller 100 may perform a cruise control or a control for following the preceding vehicle 20 without accelerating during a certain time, for example, for N seconds, and may perform a speed-based acceleration control after N seconds.

Thereafter, the vehicle driving controller 100 may repeatedly perform S130 to S230.

Figure 7:
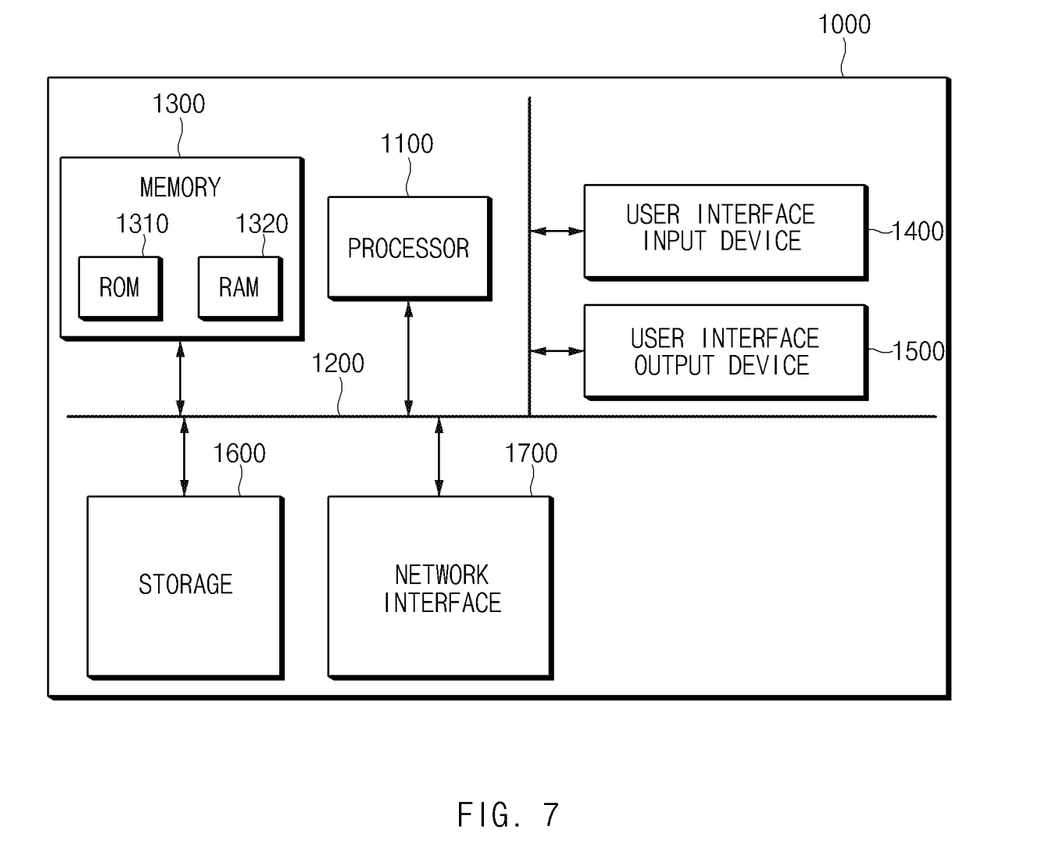
FIG. 7 is a block diagram illustrating a computing system which executes a method according to an embodiment of the present disclosure.

FIG. 7 is a block diagram illustrating a computing system, which executes a method according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The storage medium in one embodiment may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the embodiments of the present disclosure, the vehicle driving controller may control a vehicle speed of a host vehicle based on an altitude difference between the host vehicle and a preceding vehicle. Thus, a safety accident from occurring because of the incorrect recognition of a preceding vehicle is prevented.

Furthermore, according to the embodiments of the present disclosure, the vehicle driving controller may detect an altitude difference using a power spectrum of a radar, may generate a virtual layer, and may correct the power spectrum, thus minimizing an incorrect determination.

Hereinabove, although the present disclosure has been described with reference to the embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed based on the accompanying claims. All the technical ideas within the scope equivalent to the claims should be included in the scope of the present disclosure.

What is claimed is:

1. A vehicle driving controller, comprising:
    a determination device configured to identify a change in location of a reference interval having a certain magnitude value in power spectrum data received from a radar sensor configured to detect a preceding vehicle in front of a host vehicle and determine whether an altitude difference exists between the host vehicle and the preceding vehicle based on the change in the location of the reference interval;
    a correction device configured to correct a power spectrum using a virtual layer when it is determined that the altitude difference exists between the host vehicle and the preceding vehicle; and
    a controller configured to control driving of the host vehicle based on the corrected power spectrum.

2. The vehicle driving controller of claim 1, further comprising:
    a layer generator configured to generate a virtual layer corresponding to the power spectrum data.

3. The vehicle driving controller of claim 2, wherein the virtual layer is generated in response to the power spectrum data received when the host vehicle is traveling on a flatland.

4. The vehicle driving controller of claim 2, wherein the determination device determines whether the reference interval in the received power spectrum data moves in an upward or downward direction based on the virtual layer.

5. The vehicle driving controller of claim 4, wherein the determination device determines that the altitude difference exists between the host vehicle and the preceding vehicle when the reference interval moves in the upward or downward direction.

6. The vehicle driving controller of claim 2, wherein the correction device corrects the power spectrum using the virtual layer.

7. The vehicle driving controller of claim 6, wherein the correction device corrects the power spectrum by compensating for a reference location of the virtual layer to correspond to the reference interval of the received power spectrum data and inserting a predetermined correction value into an interval except for the reference interval.

8. The vehicle driving controller of claim 7, wherein the correction value is set to a value corresponding to a maximum value×α% based on the maximum value of the received power spectrum data.

9. The vehicle driving controller of claim 1, wherein the reference interval is an interval corresponding to a maximum value to the maximum value×α% based on the maximum value of the power spectrum data.

10. The vehicle driving controller of claim 1, further comprising:
    a sensor device configured to include the radar sensor and a front view camera,
    wherein the determination device combines the power spectrum data received from the radar sensor and upward/downward motion detection information of a front view camera and determines whether the altitude difference exists between the host vehicle and the preceding vehicle.

11. The vehicle driving controller of claim 1, wherein the determination device verifies a situation where the host vehicle is traveling on a sloped road, based on information received from at least one of an electronic stability control system, a navigation device, and/or a vehicle speed sensor of the host vehicle when it is determined that the altitude difference exists between the host vehicle and the preceding vehicle.

12. The vehicle driving controller of claim 1, wherein the determination device determines that a distance difference of a reference value or more exists between the host vehicle and the preceding vehicle when it is determined that an entire magnitude or a maximum value of the received power spectrum data is reduced.

13. The vehicle driving controller of claim 12, wherein the controller controls driving of the host vehicle based on a current speed of the host vehicle when it is determined that the distance difference of the reference value or more exists between the host vehicle and the preceding vehicle.

14. The vehicle driving controller of claim 13, wherein the controller performs an acceleration control over the host vehicle when the current speed of the host vehicle is less than a setting speed and performs a control over the host vehicle to follow the preceding vehicle when the current speed of the host vehicle is greater than or equal to the setting speed.

15. A vehicle driving control method, comprising:
    identifying a change in location of a reference interval having a certain magnitude value in power spectrum data received from a radar sensor configured to detect a preceding vehicle in front of a host vehicle and determining whether an altitude difference exists between the host vehicle and the preceding vehicle based on the change in the location of the reference interval;
    correcting a power spectrum using a virtual layer when it is determined that the altitude difference exists between the host vehicle and the preceding vehicle; and
    controlling driving of the host vehicle based on the corrected power spectrum.

16. The vehicle driving control method of claim 15, further comprising:
generating a virtual layer corresponding to the power spectrum data received when the host vehicle is traveling on a flatland.

17. The vehicle driving control method of claim 16, wherein the determining includes:
determining whether the reference interval in the received power spectrum data moves in an upward or downward direction, based on the virtual layer; and
determining that the altitude difference exists between the host vehicle and the preceding vehicle when the reference interval moves in the upward or downward direction.

18. The vehicle driving control method of claim 16, wherein the correcting includes:
compensating for a reference location of the virtual layer to correspond to the reference interval of the received power spectrum data; and
inserting a predetermined correction value into an interval except for the reference interval.

19. The vehicle driving control method of claim 15, further comprising:
combining the power spectrum data received from the radar sensor and upward/downward motion detection information of a front view camera of the host vehicle and determining whether the altitude difference exists between the host vehicle and the preceding vehicle.

20. The vehicle driving control method of claim 15, further comprising:
verifying a situation where the host vehicle is traveling on a sloped road, based on information received from at least one of an electronic stability control system, a navigation device, and/or a vehicle speed sensor of the host vehicle when it is determined that the altitude difference exists between the host vehicle and the preceding vehicle.

21. The vehicle driving control method of claim 15, further comprising:
determining that a distance difference of a reference value or more exists between the host vehicle and the preceding vehicle when it is determined that an entire magnitude or a maximum value of the received power spectrum data is reduced.

22. The vehicle driving control method of claim 21, wherein the controlling of the driving of the host vehicle includes:
comparing a current speed of the host vehicle with a setting speed when it is determined that the distance difference of the reference value or more exists between the host vehicle and the preceding vehicle occurs; and
performing an acceleration control over the host vehicle when the current speed of the host vehicle is less than the setting speed and performing a control over the host vehicle to follow the preceding vehicle when the current speed of the host vehicle is greater than or equal to the setting speed.

* * * * *